United States Patent
Park et al.

(10) Patent No.: US 6,267,915 B1
(45) Date of Patent: Jul. 31, 2001

(54) PRODUCTION METHOD FOR OBJECTS WITH RADIALLY-VARYING PROPERTIES

(75) Inventors: Chang-Won Park; James K. Walker, both of Gainesville, FL (US)

(73) Assignee: University of Florida, Gainesville, FL (US)

(*) Notice: Subject to any disclaimer, the term of this patent is extended or adjusted under 35 U.S.C. 154(b) by 0 days.

(21) Appl. No.: 08/929,160

(22) Filed: Sep. 12, 1997

Related U.S. Application Data

(60) Provisional application No. 60/026,454, filed on Sep. 12, 1996.

(51) Int. Cl.[7] .................................................. B29D 11/00
(52) U.S. Cl. ................... 264/1.24; 264/1.29; 264/40.1; 425/131.1; 425/382.3; 425/382.4
(58) Field of Search .................................. 264/1.1, 1.24, 264/1.28, 1.29, 1.7, 40.1; 425/131.1, 204, 205, 382.3, 382.4, 377, 461

(56) References Cited

U.S. PATENT DOCUMENTS

| | | | |
|---|---|---|---|
| 4,784,679 | * 11/1988 | Lentz | 264/1.7 |
| 4,875,917 | * 10/1989 | Lentz | 264/1.7 |
| 5,059,375 | 10/1991 | Lindsay . | |
| 5,253,323 | 10/1993 | Koike et al. . | |
| 5,382,448 | 1/1995 | Koike et al. . | |
| 5,593,621 | * 1/1997 | Koike et al. | 264/1.29 |

FOREIGN PATENT DOCUMENTS

| | | |
|---|---|---|
| 3730198 | 3/1989 | (DE) . |
| 0130838 | 1/1985 | (EP) . |
| 0145392 | 6/1985 | (EP) . |
| 0242636 | 10/1987 | (EP) . |
| 8701071 | 2/1987 | (WO) . |
| 9015706 | 12/1990 | (WO) . |

OTHER PUBLICATIONS

Emslie, Christopher (1988) "Review Polymer Optical Fibers" Journal of Materials Science 23:2281–2293.

* cited by examiner

*Primary Examiner*—Mathieu D. Vargot
(74) *Attorney, Agent, or Firm*—Allen, Dyer, Doppelt, Milbrath & Gilchrist, P.A.

(57) ABSTRACT

The present invention is a continuous process of producing an object with radially-varying material properties. These objects can be cylindrical forms made from polymeric materials. This process requires a novel device. The device can be used to produce high bandwidth gradient-index plastic optical fiber (GRIN-POF). This fiber is highly advantageous for use in high speed local area networks (LANs) as well as other short-range optical communication applications. The device can also be used to produce GRIN lenses which can be used in the focusing and transmission of images.

10 Claims, 8 Drawing Sheets

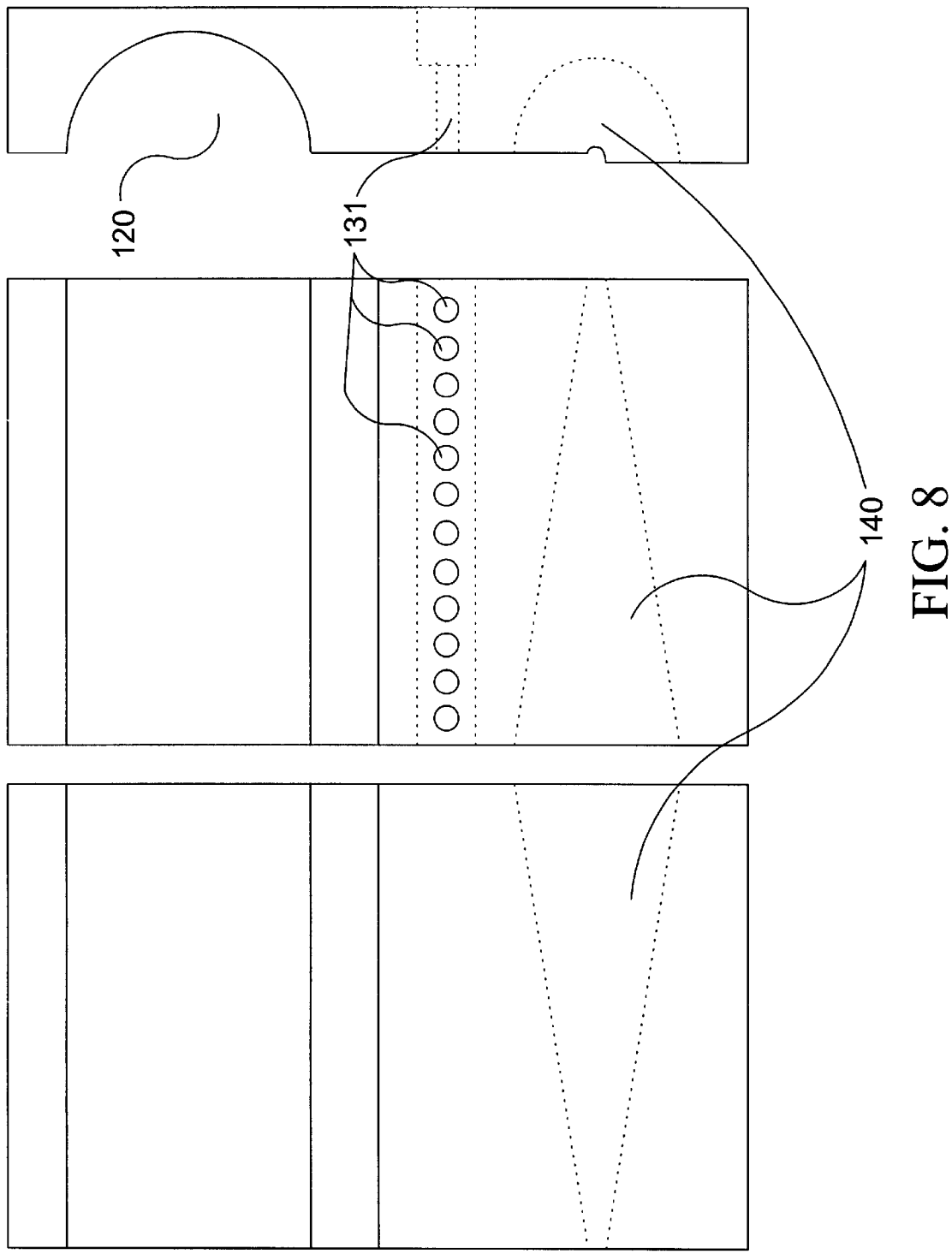

PRODUCTION METHOD FOR OBJECTS WITH RADIALLY-VARYING PROPERTIES

CROSS-REFERENCE TO A RELATED APPLICATION

This application claims the benefit of the filing date of U.S. Provisional application Ser. No. 60/026,454 filed on Sep. 12, 1996.

BACKGROUND OF THE INVENTION

It is often desirable to produce objects with radially-varying properties. These objects can be, for example, cylindrical forms made from polymeric materials. The properties which vary radially can include, but are not limited to, index of refraction, color, relative constituent concentrations, thermal expansion coefficient, scattering coefficient, and light absorption coefficient. Prior techniques for radially varying the properties of a cylindrical polymer form, for example, index of refraction, have involved the drawing of a preform made up of polymers with additives, or the addition or extraction of additives into or out of the cylindrical polymer form by, for example, diffusion. These processes impose limits on the possible radial profiles of a property resulting from the physical mechanism used to introduce or extract the additive. Therefore, it can be difficult or even impossible to achieve certain profiles which do not follow from the physics of these processes. One particular cylindrical polymer form for which the radial variation of a material property, namely, the index of refraction, can be critical is a polymer optical fiber. Optical fibers made of optical polymers are often referred to as plastic optical fibers (POFs).

In contrast to the lack of controllability of the radial variation of the index of refraction in POFs, glass, for example, silica, optical fibers have long been produced with well-controlled index of refraction profiles. One form of these glass optical fibers, specifically, single-mode glass optical fibers, have been widely used as long-distance and high-speed communication media due, in part, to low transmission attenuation. However, the small core diameter of the single-mode glass fiber, typically 5 to 10 microns, requires extreme accuracy in the alignment of the fiber for interconnection with other components of the optical communication system. This accurate alignment requirement increases the costs of the whole system. In contrast to single-mode glass fibers, multi-mode glass fibers, which can have diameters larger than single-mode glass fibers, have been used primarily for short-distance transmission such as in local area networks (LANs). However, even their moderate cost for interconnections has limited their application. Consequently, metallic cables such as twisted pair or coaxial cable are still used extensively in short range applications, namely up to 200 meters. However, these metallic cables can not meet the anticipated future bandwidth requirement of several hundred MHz (for example, the asynchronous transfer mode [ATM] standard of 625 megabits per second).

There is considerable interest in developing plastic optical fiber (POF) for use in these short range communication applications, such as LANs. POF can have core diameters of about 0.5 to 1.0 mm, which makes it possible to adopt injection-molded polymer connectors, drastically reducing the cost associated with interconnecting the POF to the other components of a system. These plastic optical fibers can have a step-index structure or a gradient-index structure. Unfortunately, step-index plastic optical fiber (SI-POF) suffers high modal dispersion and therefore cannot meet the bandwidth requirements. However, gradient-index plastic optical fiber (GRIN-POF), having low modal dispersion, shows potential to be a high bandwidth, cost effective solution for use in short range communication applications.

For more than 25 years, POF has been made using a step index (SI) structure in which a core polymer of index $n_1$ is clad with a polymer of index $n_2$. The radial dependence of the refractive index is uniform, $n_1$, out to the core cladding interface, where the index changes discontinuously to the lower value, $n_2$. A fiber with this structure can transmit data over 100 meters, at the rate of up to several tens of megabits per second. The SI-POF bit rate is limited due to modal dispersion. This rate limit can be extended only slightly by reducing the numerical aperture, or phase space acceptance, of the fiber. The latter approach has been explored where reduction of the numerical aperture from 0.5 to 0.25 increased the bit rate up to 150 megabits per second (Mitsubishi Rayon and Asahi Chemical Industry paper presented to the Third International Conference and Exhibition on Plastic Optical Fibers and Their Applications, Yokohama, Japan, Oct. 26–29, 1994). This bandwidth is not sufficient to meet the growing needs of very high-data-rate, short-distance communications.

A candidate to replace SI fiber for applications requiring fiber lengths up to about 100 meters is GRIN fiber. The theoretical advantage of GRIN fiber is the increased bandwidth (more than one gigabit per second over a 100 meter distance) due to the elimination of modal dispersion. However, the existing production methods for GRIN-POF result in the bandwidth of the fiber being neither stable nor reproducible. Additionally, existing production rates are intrinsically limited by the batch nature of the process and/or the multiple steps of the procedure.

In 1991, an early method of producing GRIN polymer fiber was presented (Koike, Y. et al. [1991] *SPIE* 1592:62–72). In 1994, experimental results were presented on the measured high-bandwidth of GRIN-POF (two papers presented by researchers at NEC Corp. and Keio University and researchers at IBM, Sandia Nat. Lab., NTT, Fujitsu and Keio University to the Third International Conference and Exhibition on Plastic Optical Fibers and Their Applications, Yokohama, Japan, Oct. 26–29, 1994). Some of the results demonstrated an acceptable bandwidth of 2.5 Gbits/sec over a 100 meter fiber length.

In the last four years, patent applications have been filed on new production processes of GRIN-POF (International Patent PCT WO 92/03750 G02B6/00 Nippon Petrochemical Co.; International Patent PCT WO 92/03751 G02B6/00; Japan Kokai Tokyo Koho JP 03-78706 G02B6/00 Mitsubishi Rayon; Japan Kokai Tokyo Koho JP 04-86603 G02B6/00 Toray Ind.). These processes can be divided into two broad types:

1. Batch processes in which a preform is made with a gradient index and subsequently drawn into a fiber. The preform is made of a polymer(s) plus a low molecular weight additive.
2. Fiber extrusion processes followed by radial extraction of low molecular weight components, and/or radial infusion of low molecular weight components, and subsequent polymerization of residual monomer. The first type of process was successful in producing fiber with the measured high bandwidth of 2.5 Gbits/second referred to earlier. The second type of process has had similar success in achieving an acceptable bandwidth.

With respect to using GRIN-POF in LANs and other related applications, the objective is to minimize modal dispersion. The required radial refractive index profile for minimal modal dispersion has been studied extensively. The model (Halley, P. [1987] *Fiber Optic Systems*, J. Wiley and Sons; Olshansky, R., D. B. Keck [1976] *Appl. Opt.* 15(2):483–491) of a GRIN fiber normally considered is that of a "power law" index variation:

$$n(r) = n_1 \left[1 - 2\Delta \left(\frac{r}{a}\right)^g\right]^{\frac{1}{2}} \quad \text{for } r \leq a \quad (1)$$
$$n_2 \quad \text{for } r > a$$

where r is the radial distance from the fiber axis, a is the radius of the fiber, $n_1$ and $n_2$ are the refractive indices at r=0 and r=a, respectively, where $n_1 \geq n_2$. The parameter g controls the index profile as a function of radius and $2\Delta = (n_1^2 - n_2^2)/n_1^2$. In the particular case where g=2, the power law is called a "parabolic law". This case is close to, but not exactly optimal for maximum bandwidth. It can be shown that if a delta function light pulse is launched into a GRIN fiber, the maximum bandwidth is B where B is given by:

$$B = \frac{c}{0.088 L n_1} \cdot \frac{1}{\Delta^2} \text{ (bits/second)} \quad (2)$$

where L is the length of the fiber, and c is the velocity of light.

Using these equations, we plot the bandwidth (shown in FIG. 1) versus the value of g, and a fixed value of $\Delta=0.01$, which is typical for communications. The important things to be drawn from the graph are:

(a) the bandwidth is extremely sensitive to the value of g near the optimum value. The curve in the figure is for zero chromatic dispersion in the GRIN fiber. The narrow spectral linewidth (<1 nm) in red Vertical Cavity Surface Emitting Laser (VCSEL) (Lehman, J. A. et al., Fourth International Conference on Plastic Optical Fibers and Applications, p. 31, October 1995, Boston) light approximates this situation, although the bandwidth peak in the figure is somewhat reduced in height, moved slightly, and broadened when dispersion is taken into account (Ishigure et al., supra).

(b) The measured bandwidth data from the batch-processed GRIN fiber is generally a factor of two to three below the theoretical curve for all g and more than one order of magnitude below the theoretical maximum value.

(c) The data is also characterized by a lack of reproducibility for any given value of g. Indeed, there is no evidence from the data of the existence of a maximum in bandwidth at any g value.

It is instructive to examine more closely the optimum refractive index profile, characterized by the value of g, versus the magnitude of material dispersion. It has recently been shown that the optimum value of g is changed from about 2 to 2.25 for a spectral line width change from 0 to 2 nm (Ishigure et al., supra). Although the anticipated use of red VCSELs in LANs will probably give a narrower line as mentioned earlier, it is clear that very tight control of the value of g to about ±0.05 is required to have optimum performing GRIN fiber in LAN systems.

There are two important considerations in the production of high quality GRIN fiber: stable processing and accurate index profiling. In one of the existing GRIN production processes, the index profile is controlled by differences in diffusion rates of monomers in gel and polymethylmethacrylate(PMMA), monomer relative reactivity rates, and diffusion rate of PMMA molecules into the gel. In another of the existing GRIN production processes, the index gradient profile is again controlled by diffusion rate of monomer out of PMMA fiber and diffusion rate of low index monomer into the PMMA fiber. Other variants of this production process exist and have similar characteristics. The above physical and chemical processes are inherently limited as to the index profiles they can produce, due to the physical and chemical mechanisms involved in the processes. Specifically, not one of the above physical processes is described by mathematical equations which will lead to power law behavior for the refractive index. Therefore, for fundamental physical reasons, the existing batch production processes cannot be expected to produce stable, pure power law behavior for the refractive index profile. For these reasons, existing GRIN-POF production methods result in fiber whose bandwidth is substantially less than theoretically possible, and is not reproducible.

BRIEF SUMMARY OF THE INVENTION

The subject invention provides a low-cost process and device for producing objects with radially-varying properties wherein the radial profiles of the properties are tightly controllable, stable, and reproducible. The radial profiles of the objects of the subject invention are produced and accurately controlled by the rigid surfaces within the device used to produce these objects. Specifically exemplified herein is the use of dies with rigid surfaces made of metal or ceramic to produce unique optical fiber products.

The process of the subject invention can be a batch or, preferably, a continuous production process. The process and device of the subject invention can be utilized with any combination of materials which are solid at room temperature, and are miscible and capable of flow at the elevated operating temperatures of the subject process and device. Even polymers with lower degrees of miscibility can, with proper processing technique, be utilized. The use of the process with optical polymers is specifically exemplified herein.

In a specific embodiment, the subject invention concerns a continuous, low-cost process of stably producing high bandwidth gradient-index plastic optical fiber (GRIN-POF). As used throughout this application, the terms "gradient-index" and "graded-index" are interchangeable. This type of fiber is highly advantageous for use in high speed local area networks (LANs) as well as other short-range optical communication applications.

The subject invention provides a novel, low cost, continuous production process which can be tailored on-line to reliably produce GRIN-POF with high throughput and greater than 2.5 gigabits per second bandwidth over a 100 meter distance.

If there is an application for GRIN-POF which allows the use of fiber having lower bandwidth, for example, less than 2.5 gigabits per second over a 100 meter distance, the subject invention can allow for the use of a larger value for $\Delta$. Referring to equation (2), a larger value for $\Delta$ will lower the upper limit on the bandwidth possible for a given L and $n_1$. Increasing the value of $\Delta$ corresponds to using a larger difference of refractive indices, $n_1-n_2$, and hence increases the acceptance of light by the fiber. The increased light acceptance can increase the effective distance of communication by the system.

The scope of the subject invention includes a high speed, continuous production process of GRIN-POF through the use of a novel die. The subject process involves extrusion through a novel die, with no need for post-extrusion processing. The subject invention can provide a low cost, continuous source of high bandwidth GRIN-POF.

In a specific embodiment of the subject invention, a fluoropolymer plus a dissolved additive can be used for the GRIN-POF core to provide a long service life. Specifically, a member of the polyfluoroalkyl methacrylate family and an additive which is an ester of phthalic acid can be used for production of the GRIN-POF core. The glass transition temperatures of these polymers are significantly higher than for the non-fluorinated analogs. The moisture absorption is typically less than about 0.1% compared to 2% for PMMA. A protective cladding polymer such as a polyfluoroolefine or blend can be used. Such a cladding confers good heat resistance and low water permeability to the GRIN-POF.

An especially preferred embodiment of the subject invention is the GRIN fiber produced from the novel process which can produce stable, and controlled, power law refractive index gradients. The process of the instant invention is particularly advantageous because the index gradient can be modified in a controlled way during the continuous GRIN production process. As a result, the bandwidth of the fiber can be measured on-line in the production process and provide feedback to help establish optimum parameters in the production process. In addition, once acceptable conditions are established, the continuous process can be highly stable for extended periods.

BRIEF DESCRIPTION OF THE DRAWINGS

FIG. 8 shows the mixing chamber and feed chamber of a specific embodiment of the GDB.

DETAILED DISCLOSURE OF THE INVENTION

The subject invention pertains to a new method of producing objects with radially-varying material properties, wherein the radial profiles of the material properties are tightly controllable, stable, and reproducible. As used herein, material property refers to any chemical or physical, including optical, property of the materials used to construct the object according to the subject invention. Examples of material properties include, but are not limited to, index of refraction, color, relative constituent concentrations, thermal expansion coefficient, scattering coefficient, and light absorption coefficient. The radial profiles of the objects of the subject invention are produced and accurately controlled by the rigid surfaces within the device used to produce these objects. These surfaces can be, for example, metal or ceramic. The process of the subject invention can be a batch or, preferably, a continuous production process. The process and device of the subject invention can be utilized with any combination of materials which are solid at room temperature, and are miscible and capable of flow at the elevated operating temperatures of the subject process and device. Even polymers with lower degrees of miscibility can, with proper processing technique, be utilized. The use of the process with optical polymers is specifically exemplified herein.

In a specific embodiment, the subject invention pertains to a new method of optical fiber production in which a coextrusion process utilizes an innovative gradient-index die block (GDB) to create a radial variation of the refractive index of a GRIN plastic optical fiber (POF). Advantageously, the methods of the subject invention can be performed as a single-step continuous process which is more efficient than any other known method. Furthermore, material selection is much more flexible since the only requirement in this process is blend compatibility of at least two optical polymers.

The two or more optical polymers which are used in the subject invention can be conveyed into the GRIN die block via many different methods. For example, two or more extruders can extrude the two or more optical polymers, at elevated temperatures, into the GRIN die block through two or more feed lines. Alternatively, the monomers of the respective optical polymers can be loaded into chambers to be heated and polymerized. The polymerization step can be carried out using any of the many well-known techniques for polymerization. Once melted, a piston, or similar device, can be inserted into each chamber to force the optical polymers in the melt state out of the chambers and into the die block. In addition, it is possible to introduce the two or more optical polymers into the GRIN die block via other mechanisms.

Figure 1:
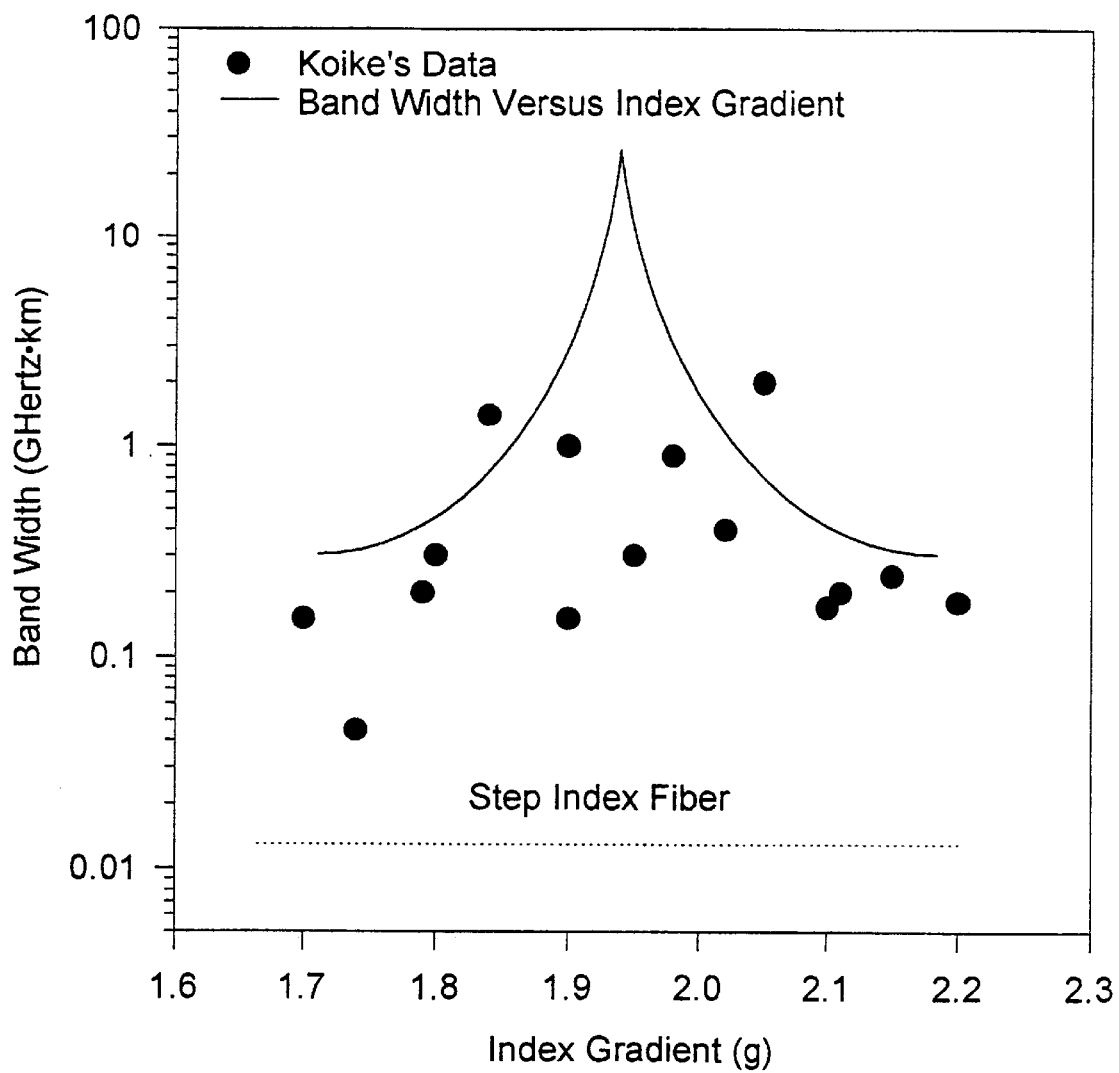
FIG. 1 shows the bandwidth of an existing GRIN-POF versus the index gradient, g.
Figure 2:
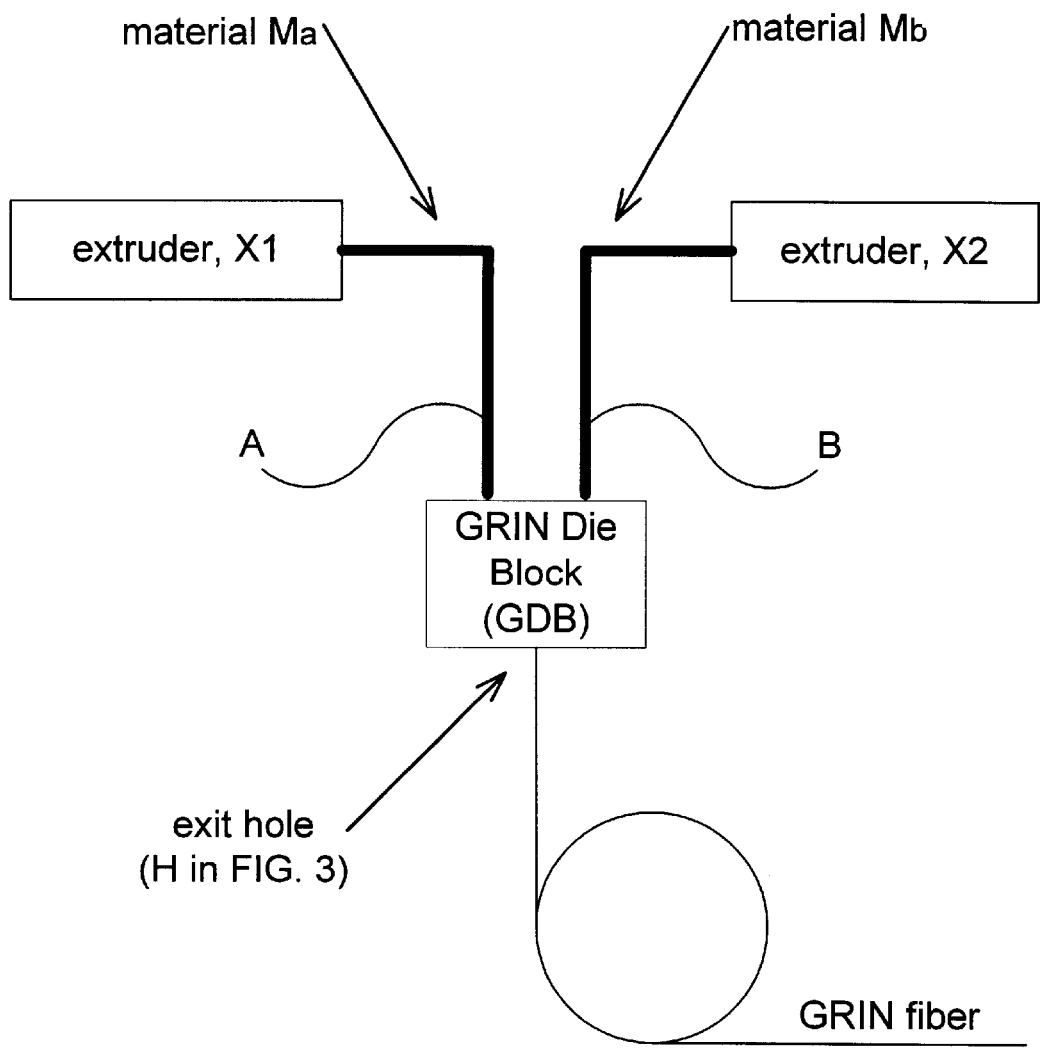
FIG. 2 is a schematic of the coextrusion process for GRIN fibers.

FIG. 2 illustrates, schematically, a specific embodiment of the subject method for continuous production of GRIN fibers. Two optical polymers (materials $M_a$ and $M_b$) with different refractive indices are introduced to the GDB through separate feed channels, A and B, by two extruders, X1 and X2. The GDB is shown, schematically, in more detail in FIG. 3. Material $M_a$, which is fed to the channel A, flows into the mixing chamber D through the channel C1, whereas the material $M_b$ flows from channel B to a mixing chamber D through the channel C2. By varying the gap, G, or length, L, of the channels C1 and C2, the flow rate of each material can be varied in the axial, or z-direction (see FIG. 4). Consequently, a blend with a gradually varying composition in the z-direction can be prepared in the mixing chamber D.

Since the refractive index of the polymer blend depends on the ratio of component polymers in the blend composition, the blended material in the mixing chamber D can have a gradually varying refractive index along the z-direction. While the rotating mixer blade D1 located in the middle of the mixing chamber D provides uniform mixing of the two materials $M_a$ and $M_b$ at each location of z, axial mixing in the z-direction does not occur since there is essentially no pressure gradient in the z-direction.

The axially varying blend prepared in the mixing chamber D is then fed through the channel E to the feed chamber F which houses a rotating cone F1. As used herein, reference to a cone refers to any tapering cylindrical form. The taper can be, but does not have to be, at a constant angle. While the material is flowing from D toward the die exit H through E and F, the axial variation of the blend composition in the mixing chamber D is converted to a radial variation, thus creating the gradient-index fiber.

Figure 4:
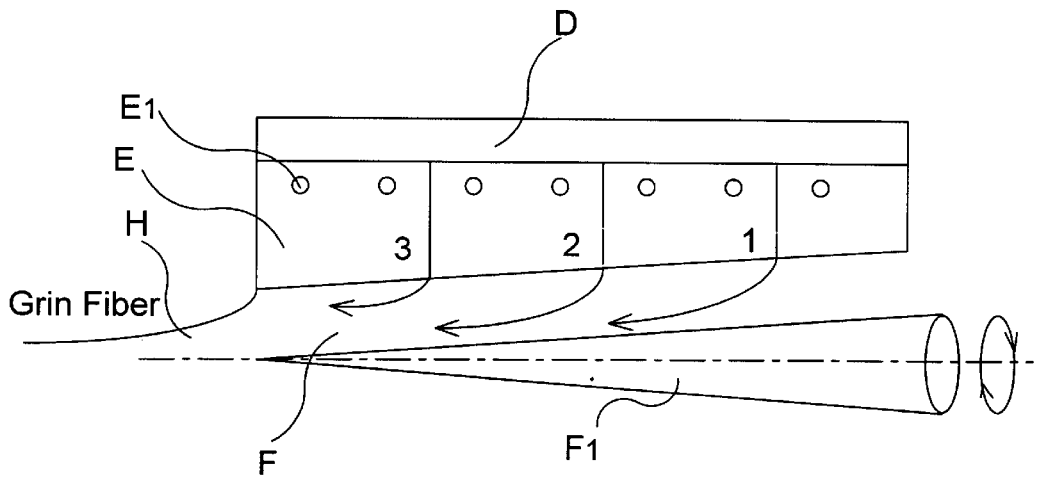
FIG. 4 is a schematic of the flow pattern in the feed chamber.

In FIG. 4, the flow pattern of the polymer blend is shown schematically. Since the material fed to the feed chamber F at a downstream location near the die exit H is swept by the upstream material, it is positioned away from the rotating cone F1. The flow patterns 1, 2, and 3 of FIG. 4 show such positioning of materials schematically. Due to the rotating cone F1, the materials in the feed chamber F follow a helical stream line pattern. For simplicity, however, only the axial and radial components of the flow pattern are depicted in FIG. 4. The rotating cone is for the uniform positioning of the material in the circumferential direction so that the axisymmetry of refractive index can be ensured while creating radially varying refractive index. The rotation speed of F1 should be sufficiently high to ensure the axisymmetry of refractive index, preferably taking into account the residence time of the material in the feed chamber F.

When the material leaves the die exit H, the circular strand has a refractive index decreasing with the radial position and a gradient-index optical fiber is formed when the strand is pulled off.

Design of a GRIN Die Block (GDB)

Figure 3:
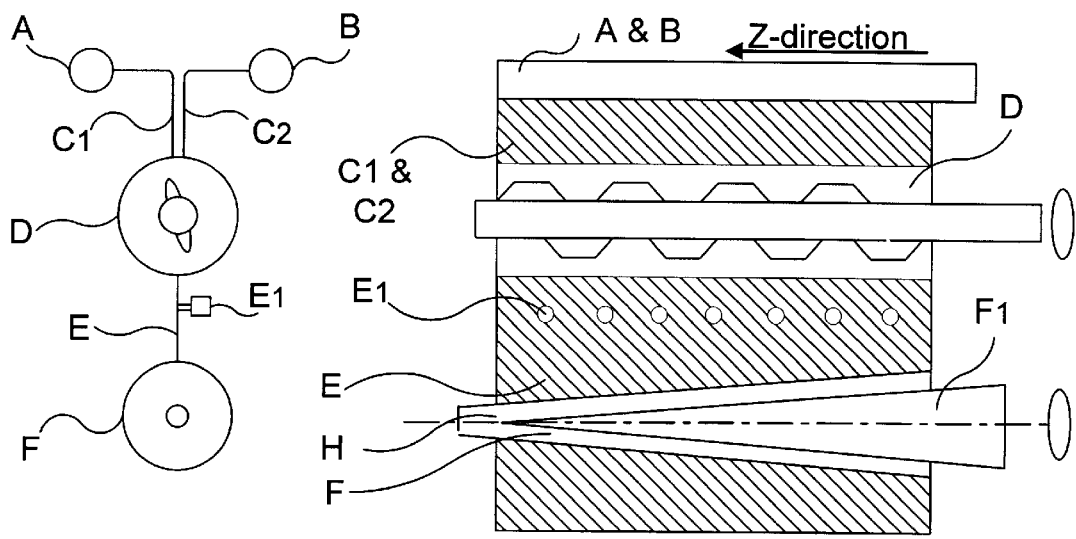
FIG. 3 is a schematic of the GRIN die block (GDB).

Particularly unique and advantageous aspects of the GDB include the mixing chamber D and the feed chamber F where the refractive index variation in the axial direction is converted to the variation in the radial direction (FIGS. 3 and 4). This conversion is possible since the polymer melt flow is laminar due to its high viscosity. In one specific embodiment, the overall outside dimension of the GDB including heating elements is about 3"×5"×6". This GDB can be fabricated using stainless steel, hastelloy, ceramic, or other appropriate material which will not react with the material used to make the cylindrical form. In the following, design considerations for each section of the GDB shown in FIG. 3 are described.

Channels A and B. Polymer materials $M_a$ and $M_b$ from extruders X1 and X2 enter channels A and B. The dimensions of these channels are such as to have a small, or negligible, pressure drop along their lengths. In this way, they provide a uniform polymer pressure along the slot entrances of channels C1 and C2.

Channels C1 and C2. These channels can be narrow slots whose gap sizes may vary in the direction perpendicular to the flow direction, which may be identified as the z-axis. Since polymers $M_a$ and $M_b$ have constant pressure along the entrance to channels C1 and C2, respectively, a varying gap size along the z-direction produces a varying flow as a function of z of the polymers $M_a$ and $M_b$ through the channels. A blend of materials $M_a$ and $M_b$, with variable proportions of $M_a$ and $M_b$ in the z-direction, is created in the mixing chamber D by the variable flow rates of the two materials through the channels C1 and C2, respectively. Design of such channels can be accomplished following the similar principles of designing slot cast dies by one skilled in the art having the benefit of the instant disclosure. The dimensions of the channels can be calculated for a desired flow rate for the specific polymers at given temperature, utilizing known and available Theological data for the given polymers. A simple non-Newtonian model such as a power-law fluid model may be used to determine the gap size profile.

A particular channel of varying gap size in the z-direction can be thought of as containing many discrete channels, each of width W, length L, and gap size G. The pressure drop across each of these discrete channels can be represented by:

$$\Delta P = 2 \frac{kL}{G} \left[ \frac{2(1+2n)q}{nG} \right]^n$$

where $q = \frac{Q}{W}$,

Q is the flow rate, and n and k are parameters for the given material.

Since the pressure is constant in the z-direction at the entrance and exit to channels C1 and C2, $\Delta P$ is not a function of z, and can be chosen as a constant, for example, 500 lbs/square inch. In a specific embodiment, at any given z position at the entrance to the mixing chamber, it is desired to have a polymer blend whose refractive index n(z) is consistent with the final radial profile. This value of n(z) is determined by the relative amount of the two materials $M_a$ and $M_b$ at that particular location in z. The above equation permits the designer to choose values of W, L, and G for a given plurality of materials, which will produce the desired index profile. Typical gap sizes for C1 and C2 are in the range of about 20 to about 100 thousandths of an inch.

In order to allow more flexibility in achieving desired material property profiles, a flow rate control element, which can alter the flow rates through channels C1 and C2, is a preferred component of the GRIN die block. The flow rate control element can be, for example, bolts which can protrude into channels C1 and/or C2, when screwed into threaded openings. In another embodiment, a single continuous slot can be used to channel the input materials. The slot opening can be manipulated by a set of external adjusters, for example, screws, or by some other pressure-exerting device acting against a flexible surface which can define the gap size of channel C1 or C2. This surface may be, for example, metal. In this way, the gap size profile of channel C1 and/or C2 can be controlled along the direction perpendicular to the flow direction. The control of the gap profile can allow adjustment of the radial variation of the targeted material property without remachining of channels C1 and/or C2.

In a specific embodiment, the refractive index n(z) entering the mixing chamber can have a simple profile, for example, linear. In this embodiment W, L, and G for C1 and C2 can also have simple relations with respect to z, for example, W constant, L constant, and G linear. This can provide a blend with a simple, for example, linear, index profile n(z) entering, and therefore leaving the mixing chamber. In this embodiment, the desired output index profile can then be realized by adjusting the length, width, and gap of channel E as a function of z. This embodiment allows the use of one of a plurality of interchangeable sections for channel E which can provide a corresponding plurality of different output index profiles n(r) in the output optical fiber.

Mixing chamber D and mixer blade D1. An approximately 10 cm long die block is appropriate for a fiber production rate of 1 kg/hr, which is equivalent to about 1 km/hr of 1 mm diameter fiber. For a homogenous mixing, intensive shear needs to be provided for a period of time sufficient to uniformly blend the two or more optical polymers. The residence time within the mixing chamber should be long enough for uniform mixing of the optical polymers. The residence time determines, for a given flow rate, the volume of the mixing chamber. For uniform mixing, residence time typically can be at least about two minutes, and mixing chamber volume typically can be at least 30 cm³. A roller style mixer blade (for example, ASTM Standard D-2538) can be used as the rotating element D1 (FIG. 3) to provide intensive shear. The size of the gap between the elliptical rotating element D1 and the interior wall of the mixing chamber D is such as to achieve adequate clearance given the construction tolerances of the die block. Preferably, this gap size will be as small as possible and is typically a few thousandths of an inch.

Channel E. The radial index profile of GRIN-POF can be controlled by the axial index profile of the blend composition entering the mixing chamber D and by the z-directional flow rate profile in the slot channel E. The gap profile of channel E can be designed to accept a known index profile n(z), for example a linear profile, from the mixing chamber and alter the known profile to create an index profile entering the feed chamber that will lead to the desired output radial index profile in the optical fiber. The physical profile of channel E can be designed to provide a power law refractive index profile described by, for example, g=2.10, i.e., at the center of the range of interest for GRIN fiber. However, in order to achieve tight tailoring of the index profile in the range 1.9<g<2.3, a flow rate control element is a preferred component of the GRIN die block. The flow restrictors E1, which can be, for example, bolts, achieve that goal by permitting fine adjustment of the z-directional flow rate profile in the slot channel E. The optimization of restrictor settings is highly advantageous in facilitating tight tailoring of the index profile. The optimum number of flow restrictors depends on the width of the slot channel E. As an example, for a 10-cm wide GRIN die block, nine restrictors can be positioned 1 cm apart (FIGS. 3 and 4). In another embodiment, a single continuous slot can be used to channel the blend from D to F. In this embodiment, the slot opening can be manipulated by a set of external screws or some other pressure-exerting device acting against a flexible surface which defines the gap profile of channel E. This surface may be, for example, metal. In this way, the gap profile of channel E is able to be controlled along the z-axis. An average value of the gap width of channel E may be, for example, about 50 thousandths of an inch.

Figure 9A:
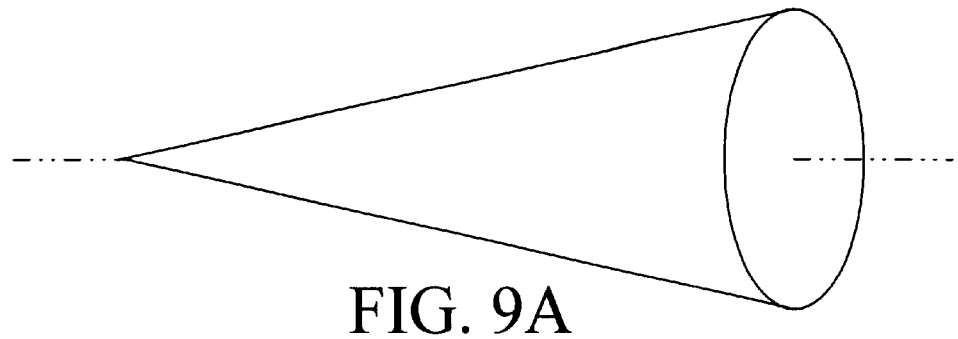
FIG. 9A shows a right-circular shaped cone having a flat or straight side.
Figure 9B:
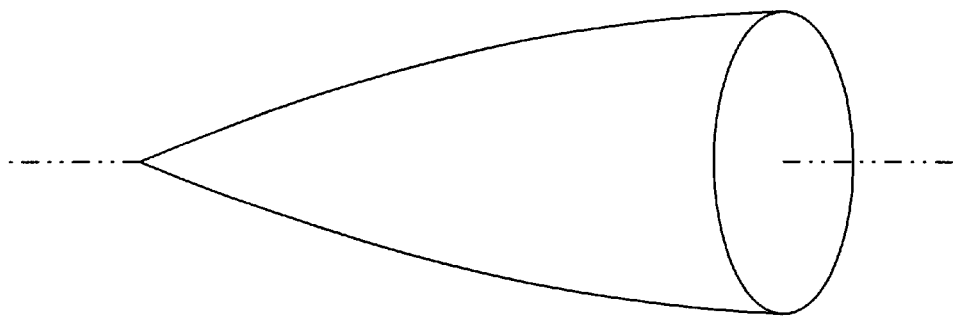
FIG. 9B shows a bullet-shaped cone having a concave curved side.
Figure 9C:
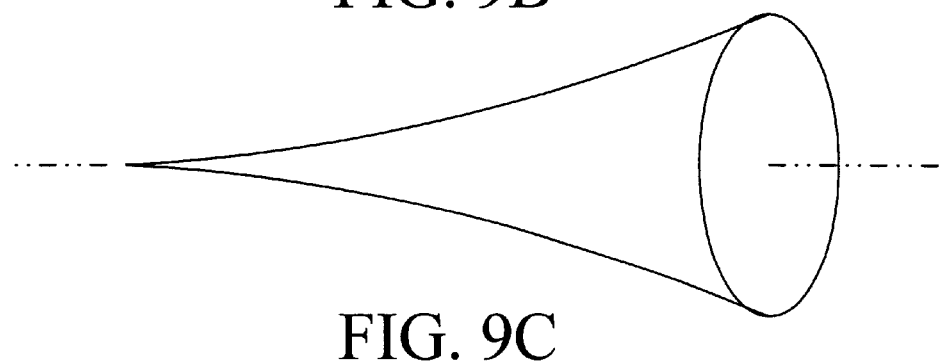
FIG. 9C shows a bullet-shaped cone having a convex curved side.
Figure 9D:
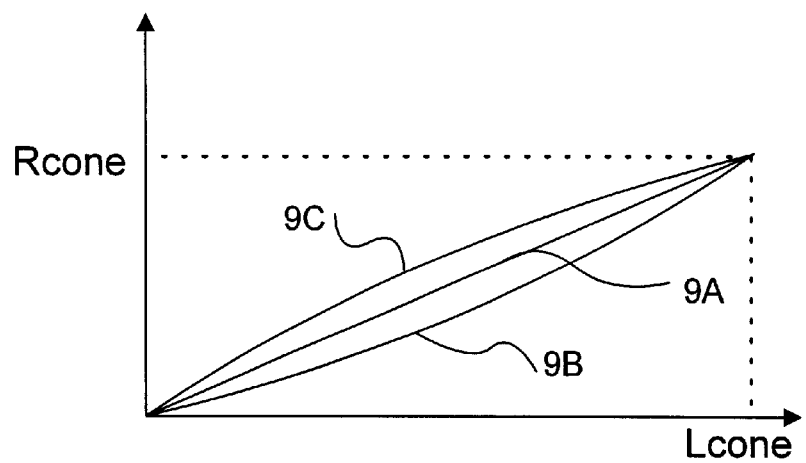
FIG. 9D shows radius profiles of the cones of FIGS. 9a–9c.

Feed chamber F and rotating cone F1. The radial variation of refractive index is produced in this section of the GDB. Once the gap profile of channel E is determined, the angle of the feed chamber F and the angle of the rotating cone F1 are also determined accordingly. The cone F1 redirects the flow of the material having an axially-varying material property into a flow having a radially-varying material property. The cone F1 will preferably have a monotonically decreasing radius from the base of the cone to the tip of the cone, which can end at a point. FIG. 9A shows a right-circular shaped cone having a flat or straight side. FIG. 9B shows a funnel-shaped cone having a concave curved side. FIG. 9C shows a bullet-shaped cone having a convex curved side. As shown in FIG. 9D, the radius, r, of the cone can be plotted as a function of z. The plot is from the tip, r=0 at z=0, to the base of the cone, r=$R_{cone}$ at $L_{cone}$. The radius profiles of the right-circular-shaped cone of FIG. 9A, the funnel-shaped cone of FIG. 9B, and the bullet-shaped cone of FIG. 9C are shown in FIG. 9D. Each of the different-shaped cones of FIGS. 9A, 9B, and 9C have a monotonically-changing radius from one end of the cone to the other. The shape of the cone F1 influences the pressure gradient in the polymer blend which induces the flow of the material along the cone. The slope, or $L_{cone}/R_{cone}$ ratio, of the cone also affects the pressure gradient of the polymer blend and therefore the flow of material along the cone. The slope must be sufficiently steep to achieve the desired flow profile for production. An excessively steep slope should be avoided because such a steep slope may adversely affect the radial profile of the output cylindrical form. The cone can be interchanged with cones of different magnitude slopes and slope profiles, with corresponding adjustments in the other design parameters, to achieve the desired radial profile of the material property. Assuming a diameter of the GRIN fiber of approximately 1 mm, the exit hole H can be approximately 3 mm or greater in diameter, providing a draw ratio of greater than about 9, which ensures the stability of the extensional flow while providing appropriate mechanical strength to the final product, approximately 1 mm diameter GRIN fiber. For a 30-second residence time of the material in the feed chamber F, a rotation speed of about 20 to 100 RPM for the rotating cone F1 provides the necessary azimuthal axisymmetry of the refractive index. The rotation speed preferably can be about 30 to 80 RPM and most preferably about 50 RPM. The helical flow pattern of the material induced by the rotating cone may result in a stress build-up in the circumferential direction. This stress, however, can be relaxed (Ohtsuka, Y., Y. Shimizu [1977] *Appl. Optics* 16:1050) while the material is flowing through the region between the tip of the cone and the exit hole H. In addition, further relaxation occurs after the exit hole H, while the polymer melt is being drawn down to the final fiber size.

Selection of materials. The two materials ($M_a$ and $M_b$) should be miscible and have a difference of refractive index typically in the range of about 0.01 to about 0.02, for communications. There is a variety of material combinations which satisfy these conditions.

1. $M_a$ is an amorphous homo-, co-, or ter-polymer such as polymethylmethacrylate(PMMA). $M_b$ is PMMA with a dissolved additive, A, whose function is to raise or lower the refractive index of $M_b$. Examples of A in these two cases are benzophenone and tributylphosphate, respectively. The additive can be mixed with the monomer of $M_b$ prior to polymerization to ensure thorough mixing. It should be noted that the molecular weight and structure of additive A can be chosen so as to minimize its diffusivity in the polymer, even at high temperature. In this way, the bandwidth of the fiber is maintained under high service temperature. This is unlike existing GRIN-POF characteristics where an additive is selected to have adequate diffusivity to create the radial index profile in the first place. That constraint is contrary to the objective of achieving a long, high-temperature lifetime of the fiber.

In the present invention, the additive is designed not to have any significant diffusion up to the service temperature of the fiber. The additive may be a moderate to high molecular weight standard additive from the esters of phosphoric, phthalic, stearic, and other acids; fatty acids; and long chain alcohols. To minimize diffusivity further, the additive may be an oligomer or other higher molecular weight compound which is soluble in the polymer.

2. $M_a$ is a polymer with an additive $A_1$, and $M_b$ is the same polymer with an additive $A_2$. The function of $A_1$ is to raise the refractive index of $M_a$, while the function of $A_2$ is to lower the refractive index of $M_b$. An advantage of this approach is that the glass transition temperatures and rheology of the two materials can be made similar. This fact makes the processing of the materials in the GRIN die block more predictable and stable.

3. $M_a$ is a polymer and $M_b$ is a co-polymer. An example of this approach is the use of PMMA for $M_a$ and a co-polymer of methylmethacrylate and benzyl-methacrylate for $M_b$. In general, blends of structurally dissimilar polymers are not miscible. However, if the polymers are well enough mixed or blended, and if they are rapidly frozen below their glass transition temperature, then the blend can be optically transparent. An advantage of the use of only polymers, at the expense of additives, in the fabrication of GRIN fiber is the great thermal stability of the resulting refractive index profile.

4. $M_a$ is a copolymer containing approximately 50–70%, and preferably 60%, by weight of benzylmethacrylate monomer and approximately 30–50%, and preferably 40%, by weight of methylmethacrylate monomer. $M_b$ is a copolymer containing approximately 30–50%, and preferably 40%, by weight of benzylmethacrylate-monomer and approximately 50–70%, and preferably 60%, by weight of methylmethacrylatemonomer. These two copolymers are miscible over the full range of 0% to 100% by weight of $M_a$. These copolymers can be utilized in accordance with the subject invention to produce GRIN fiber.

5. $M_a$ is a copolymer containing approximately 70–80%, and preferably 75%, by weight of styrene monomer and approximately 20–30%, and preferably 25%, by weight of acrylonitrilemonomer. $M_b$ contains approximately 100% by weight of polymethylmethacrylate. These two polymers are miscible over the full range of 0% to 100% by weight of $M_a$ and can be utilized in accordance with the subject invention to produce GRIN fiber. Advantageously, the large difference in refractive indices of the two polymers, $n_1-n_2=0.07$, permits a large acceptance of light by the fiber.

6. $M_a$ is a copolymer containing approximately 30–50%, and preferably 40%, by weight of methylmethacryla-temonomer and approximately 50–70%, and preferably 60%, by weight of trifluoroethylmethacrylate. $M_b$ is a copolymer containing approximately 50–70%, and preferably 60%, by weight of methylmethacrylate monomer and approximately 30–50%, and preferably 40%, by weight of trifluoroethylmethacrylate. These two copolymers are miscible over the full range of 0% to 100% by weight of $M_a$. These copolymers can be utilized in accordance with the subject invention to produce GRIN fiber.

Other combinations of materials will be apparent to those skilled in the art. Additionally, it is apparent that more than two materials can also be used. In all of these materials, it is also possible to include small quantities of additives to act as plasticizers, antioxidants, and light stabilizers.

Measurements of the radial dependence of the refractive index. To determine the radial refractive index profile, the transverse interferometric technique using the INTER-PHAKO (Carl Zeiss, Jena, Germany) interference microscopic method has been developed by Ohtsuka and Shimizu (1977, supra). It has been used extensively for measurements of GRIN fiber. The accuracy attainable with this method has been shown (Ohtsuku, Y., Y. Koike [1980] *Appl. Optics* 19:2866) to be adequate for the present purposes. The ability to accurately and quickly measure the radial refractive index profile allows the process operator the ability to fine tune the flow restrictors E1, even during the production process, to achieve an optimal radial refractive index profile.

The subject GRIN-POF melt extrusion production technique can be extended to in-line extrusion of a cladding on to the GRIN fiber. This requires an extruder with either a separate standard "wire coat" die or a suitably modified GRIN die block (GDB). In this way, the entire production process of clad GRIN-POF can be made continuous and high speed.

The subject invention produces fiber with a routine and stable bandwidth capability in excess of 2.5 gigabits per second, over a 100 meter length. The fiber diameter can be in the range of about 0.25 to about 3.0 mm, and the production rate can be designed to be in the range of about 0.1 to more than 100 km/hour.

Following are examples which illustrate procedures for practicing the invention. These examples should not be construed as limiting. All percentages are by weight and all solvent mixture proportions are by volume unless otherwise noted.

EXAMPLE 1
GRIN-POF with Small Δn (Approximately 0.01–0.02)

Having provided a general description of the subject invention, a specific embodiment will now be described. This specific embodiment utilizes a coextrusion process and associated die block to produce GRIN plastic optical fiber. The die block is specifically designed for the following two optical polymers: (1) PMMA plus 5% benzophenone; and (2) PMMA plus 5% tributylphosphate. In addition, the die has been designed to yield, using the two aforesaid optical polymers, a parabolic index of refraction profile.

Figure 5:
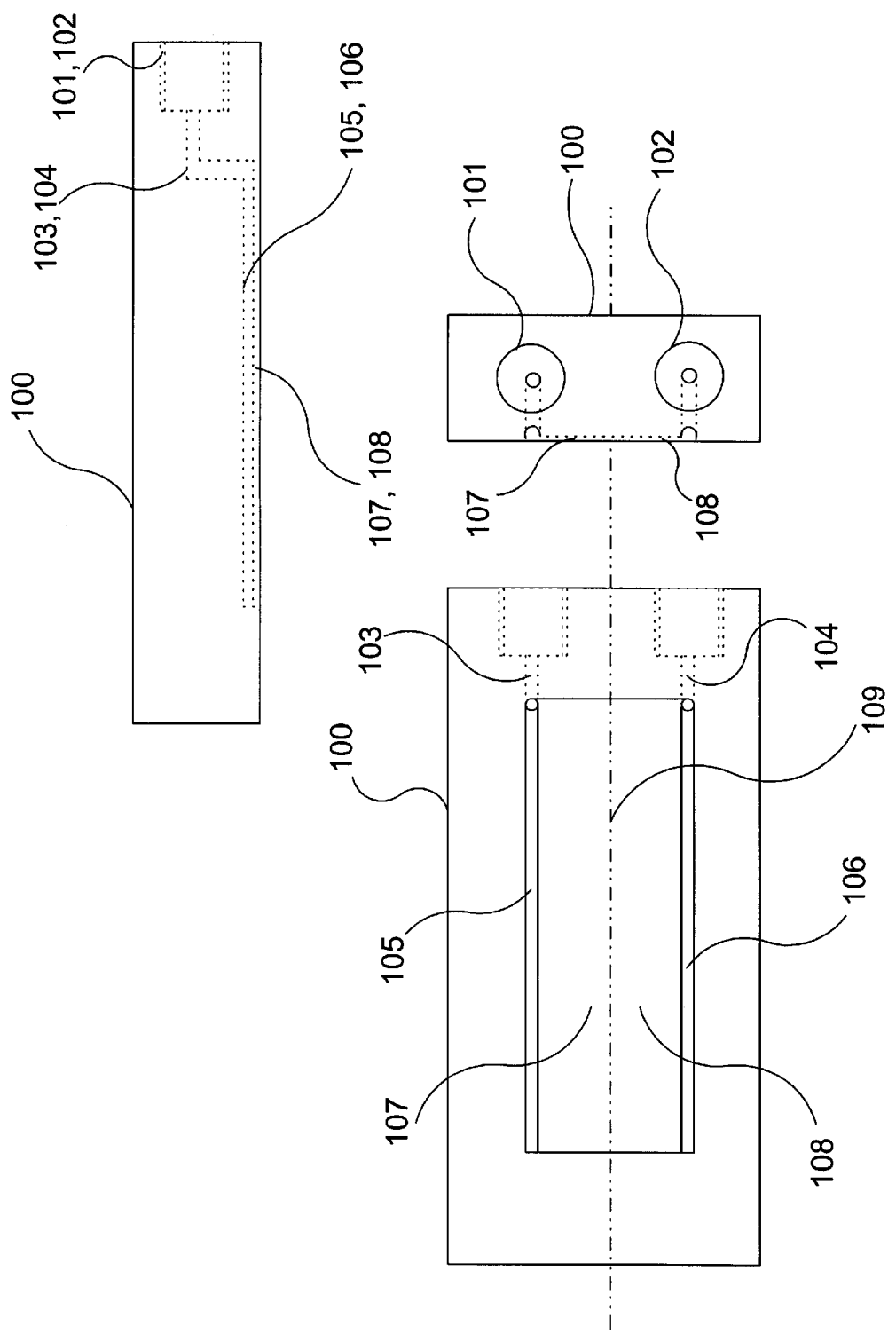
FIG. 5 shows C1 and C2 of a specific embodiment of the GDB.

Referring to FIG. 5, the top of the GRIN die block (GDB) 100 receiving the optical polymers from without the GDB, for example, from external extruders, is shown. Two input couplers 101, 102 which receive the optical polymer materials $M_a$ and $M_b$ are threaded to engage with the external extruders. The materials $M_a$ and $M_b$ then flow through separate 90-degree elbow turns 103 and 104, respectively, to reach two half-circle feed lines 105 and 106. These half-circle feedlines 105 and 106, approximately 3.0 inches long and having a 5/16-inch half-circle groove, feed $M_a$ and $M_b$ into channels 107 and 108. Channels 107 and 108 are slot channels with a constant length of approximately 0.5 inches and width of approximately 3.0 inches. These slot channels 107 and 108 have a varying gap along the length of the associated feedlines 105 and 106. For reference, the feedlines run along the z-direction. The gap for each channel 107 and 108 varies, as a function of z, in order to control the flow rate of $M_a$ and $M_b$, respectively, into the mixing chamber 120 (shown in FIG. 6). The flow of $M_a$ through channel 107 and the flow of $M_b$ through channel 108 come together and flow laminarly, without mixing, through the uniform gap 109 into the mixing chamber 120.

For this specific embodiment, channel 107 has a gap size which varies linearly from 57 mils at z=0 to 47 mils at z=1.5 inches, and linearly from 47 mils at z=1.5 to 25 mils at z=3.0 inches. In contrast, channel 108 has a gap size which varies linearly from 25 mils at z=0 to 47 mils at z=1.5 inches, and linearly from 47 mils at z=1.5 inches to 57 mils at z=3.0 inches.

Figure 6:
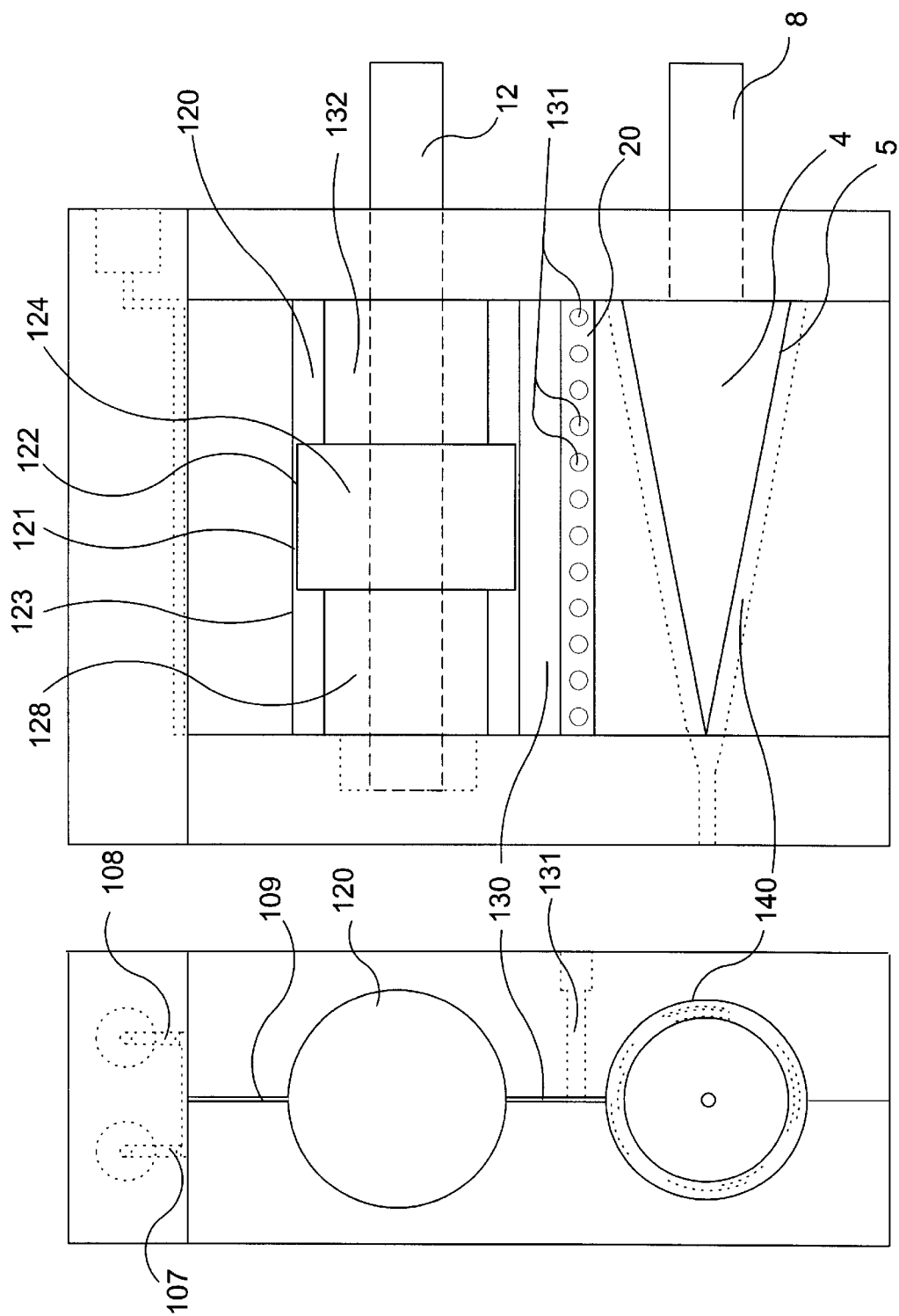
FIG. 6 shows the mixing chamber and feed chamber of a specific embodiment of the GDB.
Figure 7:
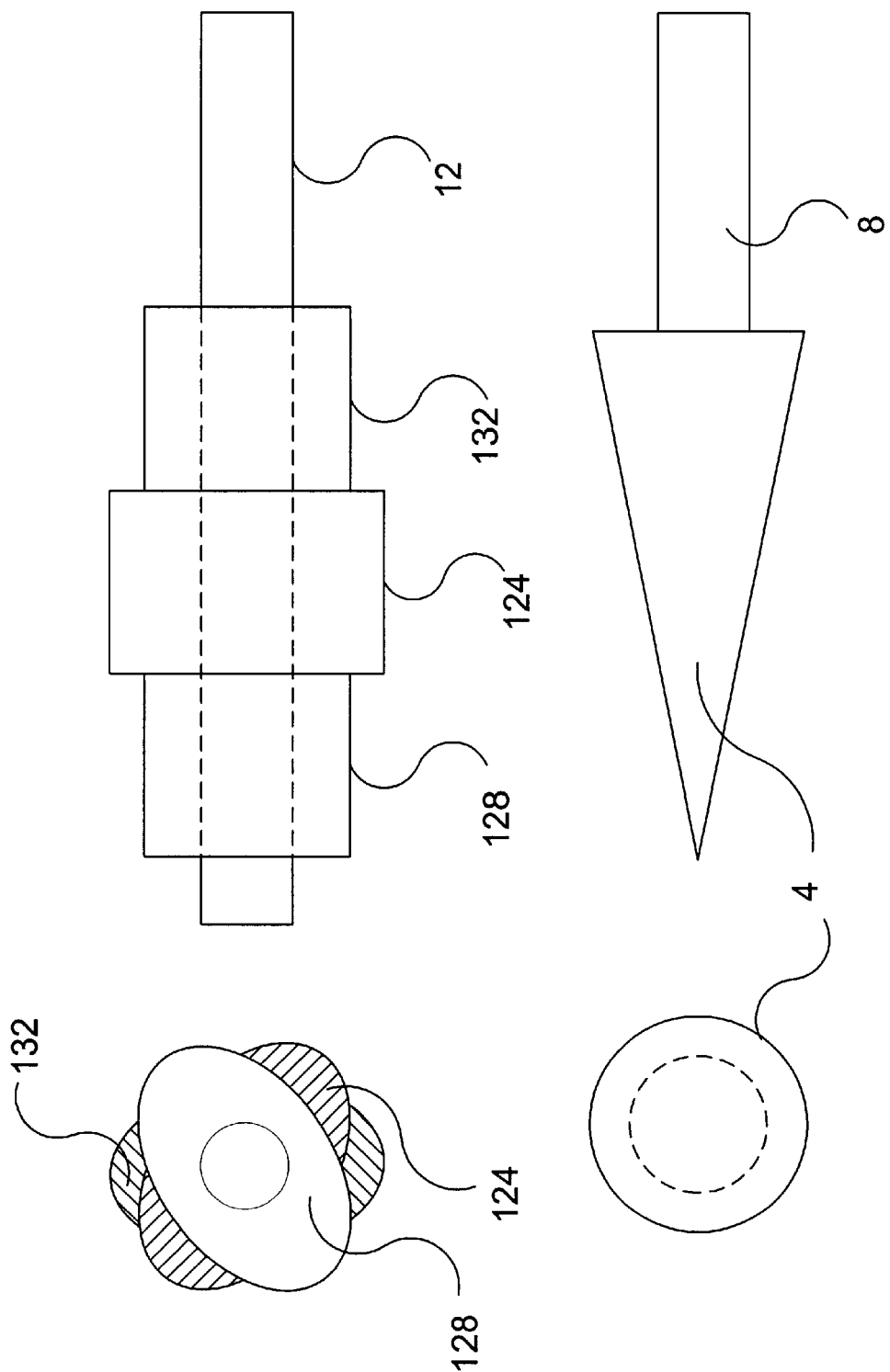
FIG. 7 shows the mixer blades and rotating cone of a specific embodiment of the GDB.

Referring to FIG. 6, once in the mixing chamber, $M_a$ and $M_b$ are blended or mixed together by an elliptical mixer blade, for example, 124. There can be a plurality, n, of these mixer blades 124, 128, 132, wherein, referring to FIG. 7, the plurality, n, mixer blades are offset from each other by 360÷n degrees. FIG. 7 exemplifies n=3; therefore, the mixer blades 124, 128, 132 are offset by 120 degrees. The size of the gap 121 is on the order of a few-thousandths of an inch. In this specific embodiment, the gap size is 3 mils. Specifically, the major axis of the elliptical mixer blade 124 is 1.500 inches, while the interior diameter of the mixing chamber is 1.506 inches. The mixer blades are shown in FIG. 7. Each mixer blade has a 1.500-inch major axis, a 1.000-inch minor axis, and is 1.0 inches thick. There is a 0.5-inch diameter shaft 12 onto which the mixer blades are attached.

The blended material comprising $M_a$ and $M_b$ exits the mixing chamber 120 through channel E 130 and flows into a conical feed chamber 140. Channel E 130 is a slot channel and can have flow restrictors, which can be ⅛-inch threaded bolts. These bolts are threaded into threaded openings 131. When these bolts are screwed into threaded openings 131, the tips of the bolts protrude into channel E 130 and restrict the flow of a portion of the blended material from the mixing chamber 120 to the conical feeding chamber 140. The controlled restriction of the flow into the feeding chamber alters the z-direction index of refraction profile, which ultimately alters the radial output index of refraction profile of the GRIN-POF. These bolts can be spaced at about one per centimeter across channel E 130 to allow for control of the flow of the blended material through channel E 130.

Within the conical feed chamber 140, a cone 4 is housed, wherein the cone 4 is mounted on a shaft 8. In FIG. 4, the flow pattern of the polymer blend from channel E 130 into the conical feed chamber 140, and onto the rotating cone 4 is shown schematically. Specifically, flow patterns 1, 2, and 3 of FIG. 4 show the flow onto the rotating cone 4, which provides the transformation of the longitudinal index of refraction profile, in the z-direction, to a radial index of refraction profile within the optical fiber which is drawn from the GDB. The rotation of the cone 4 leads to a helical stream line pattern with respect to each differential flow from channel E 130, within the output fiber. The rotation speed of the cone 4 is an operating parameter to ensure the axisymmetry of the radial index of refraction profile. For a 30-second residence time of the material in the feed chamber 140, a rotation speed of about 20 to 100 RPM provides the necessary azimuthal uniformity of the refractive index. The slope of the cone 4, in this embodiment, is approximately ⅙. Since this GDB is designed to produce fiber of about 1 mm diameter, the exit hole is approximately 3 mm in diameter, providing a draw ratio of about 9, which ensures the stability of the extensional flow while providing appropriate mechanical strength to output GRIN-POF.

EXAMPLE 2

GRIN-POF with Large Δn (Approximately 0.02–0.1)

This example uses the same geometry of die block and produces GRIN fiber with a large variation of refractive index ($\Delta n \leq 0.1$) over the radius. Materials Ma and Mb are polybenzylmethacrylate and polymethylmethacrylate and approximately equal flow rates of these two materials are used.

In all respects, the die block is identical to that described in Example 1. The fiber is rapidly quenched upon exit from the die. The refractive index varies from about 1.55 on the axis down to about 1.50 at the outer edge of the fiber. For some purposes this large numerical aperture is more desirable due to more effective use of light.

EXAMPLE 3

A Plastic GRIN Lens

In another specific embodiment, a die block can be designed to produce a polymeric cylindrical form having a diameter ranging from about 0.5 mm to about 3.0 mm. GRIN fiber with large Δn, as in example 2, can be produced with this die block. A rod lens can be produced by cutting this polymeric fiber to the length necessary to achieve the desired focusing power or focal length. Each end of the lens is then polished. Such lenses may be used at the distal end of the multifiber bundles comprising endoscopes and boroscopes. They may also be used in arrays in copying machines and the like. In addition, they may be used for efficient coupling of light from a source into an optical fiber.

EXAMPLE 4

In another specific embodiment, a die block can be designed to produce a polymeric cylindrical form having a diameter ranging from about 0.5 mm to about 3.0 mm. This polymeric cylindrical form can be used to transmit an image through the single fiber by cutting the form to length and polishing both ends. This polymeric form can be used as an endoscope or boroscope for medical or industrial imaging, respectively.

EXAMPLE 5

A Negative Gradient Lens

In another specific embodiment, the die block in Example 3 may be used to produce a negative gradient lens. This type of lens is produced by exchanging the polymer materials at the entry channels to the GRIN die block. This type of lens can be used to correct aberrations in an image transfer GRIN fiber system of the type described in Example 4.

EXAMPLE 6

In another specific embodiment, a die block can be designed to produce a polymeric cylindrical form having a radial index of refraction profile having a first derivative which can go from positive to negative and/or negative to positive as the radius, r, goes from 0 to the radius of the form, a. In fact, the first derivative of the profile can experience multiple transitions from positive to negative and/or negative to positive. This control of the profile is achieved by controlling the gap profiles of the channels C1 and C2 which channel the polymeric materials to the mixing chamber.

It should be understood that the examples and embodiments described herein are for illustrative purposes only and that various modifications or changes in light thereof will be suggested to persons skilled in the art and are to be included within the spirit and purview of this application and the scope of the appended claims.

What is claimed is:

1. A process for producing a graded-index plastic optical fiber with a radially-varying index of refraction, wherein said process transforms an axial variation of said index of refraction into said radial variation of said index of refraction, wherein said transformation to said radial variation is achieved by applying polymeric material having said axial variation of said index of refraction to a rotating cone which converts said axial variation to said radial variation, wherein said process comprises combining at least two polymers having different indices of refraction so as to create a combination having an axial variation of index of refraction, said process comprising the steps of:

(a) introducing said optical polymeric materials into a die block;

(b) channeling each optical polymeric material into a mixing chamber, which houses a mixing means, such that the ratio of said optical polymeric materials varies within said mixing chamber along a first axis;

(c) mixing said optical polymeric materials within said mixing chamber such that said blend has said axial variation of index of refraction along said first axis;

(d) channeling said axially varying blend into a feed chamber which houses said cone; and (e) after applying said blend to said rotating cone, pulling a polymeric cylindrical form from the tip of said cone, wherein said polymeric cylindrical form has said radial variation of index of refraction.

2. A device for producing a polymeric cylindrical form with at least one radially-varying material property comprising:
   a transforming means for transforming an axial variation of said material property into said radial variation of said material property;
   a combining means for combining at least two optical polymeric materials having a material property of different indices of refraction so as to create a combination having an axial variation of index of refraction;
   a mixing chamber, wherein a blend of said polymeric materials is created;
   an introducing means for introducing said optical polymeric materials into said device;
   a first channeling means for channeling each optical polymeric material into said mixing chamber such that the ratio of said optical polymeric materials varies within said mixing chamber along a first axis;
   a feed chamber;
   a second channeling means for channeling said axially varying blend into said feed chamber which houses a rotating cone; and
   a pulling means for, after applying said blend to said rotating cone, pulling said polymeric cylindrical form from the tip of said cone, wherein said polymeric cylindrical form has a radial variation of index of refraction,
   wherein said transforming means is a cone which converts said axial variation to said radial variation, wherein said transformation to said radial variation is achieved by applying polymeric material having said axial variation of said material property to said cone while said cone is rotating.

3. The device, according to claim 2, wherein said first channeling means has a gap profile which varies along said first axis in such a way as to determine the radial variation of refractive index of said graded-index plastic optical fiber.

4. The device, according to claim 2, wherein said second channeling means comprises a plurality of flow restrictors such that adjustment of said flow restrictors can fine-tune the radial variation of refractive index of said polymeric materials.

5. The device, according to claim 4, wherein said plurality of flow restrictors are bolts.

6. The device, according to claim 2, wherein said second channeling means comprises a flexible surface which defines the gap profile of said second channeling means and a set of external adjusters wherein said set of external adjusters can adjust the position of said flexible surface and therefore change the gap profile of said second channeling means, thus fine-tuning the radial variation of refractive index of said polymeric materials.

7. The device, according to claim 2, wherein said mixing chamber has a plurality of elliptical mixer blades.

8. The device, according to claim 2, wherein said first channeling means comprises a plurality of flow restrictors such that adjustment of said flow restrictors can alter the radial variation of refractive index of said fiber.

9. The device, according to claim 2, wherein said first channeling means comprises a plurality of flexible surfaces which define the gap profile of said first channeling means and a set of external adjusters wherein said sets of external adjusters can adjust the position of said flexible surfaces and therefore change the gap profile of said first channeling means, thus altering the radial variation of refractive index of said fiber.

10. The process, according to claim 1, wherein said die block comprises flow restrictors, wherein the index of refraction profile is measured during the process, thus allowing adjustment of said flow restrictors during the process to fine-tune the profile to achieve the desired profile.

* * * * *